May 23, 1967      D. A. EPP      3,321,175

IRRIGATION PIPE GATE

Filed Nov. 23, 1964

INVENTOR.

David A. Epp

BY

Scofield, Kokjer, Scofield & Lowe

ATTORNEYS.

United States Patent Office 3,321,175
Patented May 23, 1967

3,321,175
IRRIGATION PIPE GATE
David A. Epp, Henderson, Nebr., assignor to Henderson Manufacturing Co., Inc., a corporation of Nebraska
Filed Nov. 23, 1964, Ser. No. 413,222
5 Claims. (Cl. 251—145)

This invention relates generaly to side wall valve or gate structures for use in above ground irrigation pipe and refers more particularly to an improved detachable rotary gate for such use.

One of the principal objects of the invention is to provide a valve or gate which can be sealed in a side opening in thin walled, above ground irrigation pipe, working only from the outside of the pipe, and which provides, when installed, a pressure-tight seal in the opening.

A further object of the invention is to provide a valve or gate arrangement of the character described which requires no special treatment or forming of the pipe other than the provision of a simple opening having substantially the same peripheral shape as the main valve body. Stated otherwise, with my valve structure the preparation of the pipe requires nothing more than the punching or cutting of a single opening of routine shape for each valve or gate.

Still another object of the invention is to provide a valve or gate structure of the character described in which the opening and closing thereof is simply a matter of manipulating a single control knob. A special feature of the invention in this respect resides in the means for assuring of complete and tight closing of the gate and in the positive indexing of the closure plate as it moves into full closed position.

Among further objects of the invention are the provision of a gate which can be manufactured at relatively low cost, which includes provision for quick attachment of a lateral sock, which is light in weight and easily handled, which can be installed in the pipe without requiring the use of special tools, and which, if need be, can be removed and repaired or replaced quickly and easily.

Other and further objects of the invention, together with the features of novelty appurtenant thereto, will appear in the course of the following description.

In the accompanying drawing, which forms a part of the specification and is to be read in conjunction therewith and in which like reference numerals indicate like parts in the various views.

Figure 1:
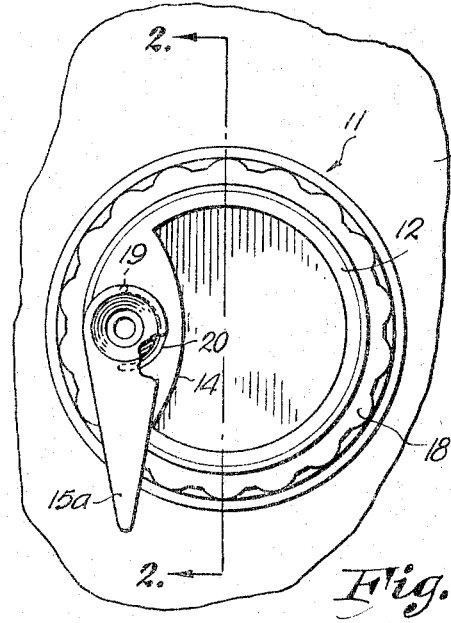
FIG. 1 is an outer end view of a preferred gate structure embodying the invention showing the gate structure in preliminary position in the pipe opening and ready for final installation therein.

Referring to the drawing, reference numeral 10 represents generally a fragmentary portion of the side wall of a length of above ground irrigation pipe. As is known to those familiar with irrigation equipment, such pipe is ordinarily of fairly large diameter and is thin walled. Conventionally it is roll formed from coils of aluminum sheet on a continuous basis and cut to desired lengths.

The gate structure embodying the instant invention is generally indicated at 11. As will be seen, it is associated with a circular opening 10a in the pipe sidewall. These openings will be provided along the pipe as required by the need or desire for lateral flow outlets from the pipe.

The main body of the valve structure comprises a tubular member 12 having the external threads 12a at the outer end. It will be noted that the tubular body increases in outside diameter from the threads toward the other end, thus providing the frusto-conical flared surface portion 12b which terminates at the outer end portion 12c. End portion 12c has an end face 12d which is provided with an annular groove in which is received a resilient sealing member 13. It is important to note that the external diameter of the end flange 12c is just slightly less than the effective diameter of the pipe opening 10a so that the valve body can be inserted from outside the pipe into the interior of the pipe with the end portion 12c in the interior of the pipe.

The tubular body 12 is provided with a thickened wall portion providing the longitudinal boss 14 along one side thereof. This boss has a passageway therethrough parallel with the axis of the tube, the passage being cylindrical and receiving therein the shaft 15. The shaft 15 terminates at its outer end in an elongated hand knob 15a and has the reduced diameter extension 15b at the other end which projects beyond the plane of the end face 12d of the end portion 12c of the main body. The extension 15b is non-circular, preferably being rectangular, and has fitted thereover a correspondingly shaped opening in the circular fly or closure plate 16. The closure plate 16 is secured in place on shaft 15 by means of the machine screw 17 which is threaded into a tapped bore in the shaft 15.

The closure plate 16 is circular in outline and has substantially the same outside diameter as the outside diameter of the end portion 12c of the main body. In its closed position it registers and is coaxial with the end face 12d. A shallow annular groove 16a is cut into the inside face of the closure plate 16 and this groove serves to provide a shoulder which slips over and is engaged by the portion of gasket ring 13 projecting beyond the plane of end face 12d when the fly is closed.

Figures 3, 4, 5:
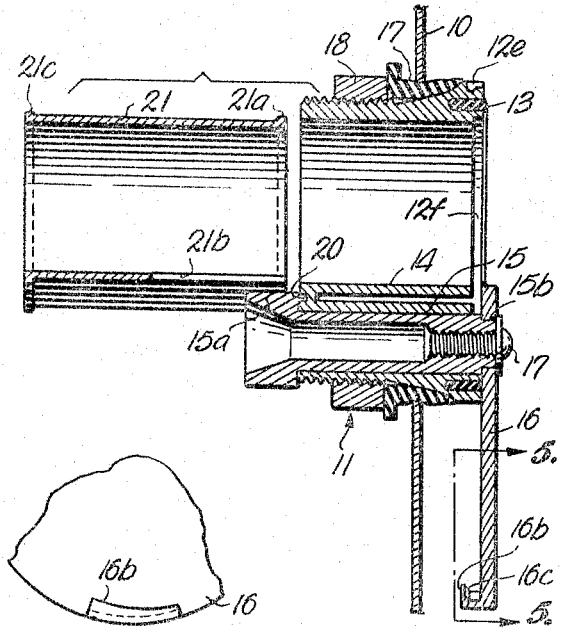
FIG. 3 is a view similar to FIG. 2 but illustrating the gate structure in its completely assembled and secured relationship with the pipe, the sock coupling attachment not shown in this figure.
FIG. 4 is a sectional view taken along line 4—4 of FIG. 3 in the direction of the arrows, but showing the fly or closure plate of the gate in the full open rather than closed position and the sock coupling attachment in exploded relationship with the gate.
FIG. 5 is a fragmentary view taken along line 5—5 of FIG. 4 in the direction of the arrows.

It will be noted that the fly plate 16 includes at a location therein diametrically opposite the shaft extension 15b and inturned lip 16b. Upon closure of the fly plate with respect to the tubular body, this lip meshes with a similarly shaped cut-out 12e in the rim of portion 12c which serves in cooperation with the lip to draw the plate into firm axial engagement with the sealing ring 13. It can be seen that the inner surface 16c of the flange 16b is beveled and the same is true as to the cooperating surface of the cut-out 12e. As shown in FIG. 5, the shape of the flange 16b, particularly with reference to its tapered thickness in a radial direction, is such that when the plate is rotated into the full closed position, it can travel no further in that direction of rotation. In other words, the lip 16b serves two principal functions; first to assist in drawing the plate tightly against the tubular body and into engagement with the sealing ring 13, and secondly, to provide a limit stop preventing turning of the closure plate beyond the full closed position.

Figure 2:
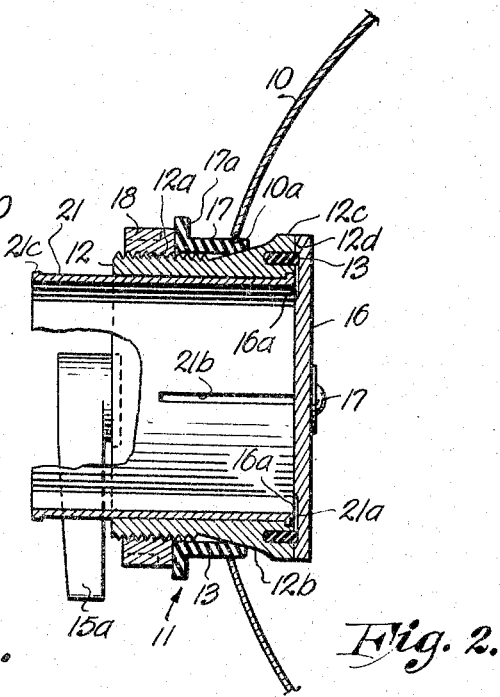
FIG. 2 is a sectional view taken along line 2—2 of FIG. 1 in the direction of the arrows, a sock coupling attachment being shown in its inserted position in the main body.

As shown in FIG. 2, circumscribing the smaller end of the conical surface 10a is a resilient sleeve 17 having the annular flange 17a. The inside diameter of sleeve 17 which, incidentally, is made of rubber or other elastomeric material, is substantially less than the outside diameter of the major portion of the surface 10a and the end portion 12c. The flange 17a is engaged at its outer end by the knurled nut 18, which is threaded onto the threads 12a of the main body.

In installing the valve in a pipe, the sleeve 17 is located in a preliminarily unexpanded condition, as shown in FIG. 1, with the backup nut 18 threaded onto threads 12a. The outside diameter of sleeve 17 is substantially that of the opening 10a and the valve unit is placed end on into the opening as shown in FIG. 2.

Holding the structure in this position, the nut 18 is then threaded further on to the tubular body, thus forcing the sleeve 17 onto the tapered surface 12b which serves to expand the sleeve outwardly into contact with the edge of the pipe opening 10a. The nut is screwed down on threads 12a until the sleeve 17 is expanded and compressed tightly in the opening as shown in FIG. 4.

In operating the gate, that is, to move the plate 16 from open to closed or any intermediate position, it is necessary only to apply turning pressure to the hand knob 15a. The plate 16 is self-indexing in the closed position, as the knob cannot be turned further once the plate is fully closed as explained above. In order to limit the rotation of the gate to the 180° angle between full closed and full open, the knob 15a may be provided with a pin 19 which travels in an arcuate groove 20 formed in the boss 14. The groove is at least 180° in length with the ends conforming in location relative the pin with the full closed and full open positions for the fly or closure plate 16.

It will be evident that if it is desired to remove the structure from the pipe, all that is required is to back the nut 18 away from sleeve 17. The elasticity of the sleeve will cause it to contract and slide rearwardly on the surface 12b thus reducing its outside diameter again to the original unstressed valve. The structure is thus freed from its secured relationship with the pipe and can be withdrawn.

In FIGS. 2 and 4 there is shown a sock coupling attachment 21 which is press fitted into the body 11 when a means for tying a lateral sock (not shown) to the gate is needed. The attachment 21 has the same cross sectional configuration as the interior of the body 12 so that it can be slipped longitudinally into the body. It is a thin-walled tubular element preferably molded from a resilient synthetic resin such as high density polyethylene or the like. At its inner end it is provided with a peripheral lip or flange 21a which, when the attachment is inserted in the body 12 to the full depth thereof, mates with a rabbeted shoulder 12e formed in the body. A longitudinal cutout 21b is provided in the inner end portion of the attachment, this permitting the temporary size reduction in the attachment necessary for insertion in the body. The other end is provided with a ridge 21c which serves as a stop over which the sock (not shown) can be sleeved and tied.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A gate structure for controlling flow through an opening in the wall of a pipe comprising
    an open ended tubular body having an inner end insertable in said opening and an outer end, the inner end of said body having substantially the same outline as said opening,
    said body having an external wall surface portion which is tapered in the direction away from said inner end toward the outer end,
    a resiliently radially expansible sleeve surrounding said body between said outer end and said tapered portion and having a projected inside cross sectional area, when unstressed, less than the projected outside cross sectional area of the largest end of said tapered portion,
    thrust means interconnecting said sleeve and body and operable to displace said sleeve relative said tapered portion toward said inner end and to radially expand said sleeve and tightly engage it between the edge of said opening and said tapered portion,
    a closure plate covering the inner end opening of said body, and
    means operable from said outer end of said body to pivot said closure plate between covered and uncovered positions with respect to said inner end opening.

2. A gate structure as in claim 1 wherein said last named means comprises a longitudinal boss on the inside of said body, and
    a shaft extending lengthwise and rotatably through said boss,
    said closure plate secured to the inner end of said shaft for rotation therewith.

3. A gate structure as in claim 1 including interlocking elements on said body and closure plate operable to releasably secure the plate into end covering position in response to movement of the plate into said position.

4. A gate structure as in claim 1 including a resilient sealing gasket partially embedded in the inner end of said body around the opening therethrough, said gasket having a protruding ridge operable to sealingly engage said closure plate.

5. A gate structure for controlling flow through a circular opening in the wall of a pipe comprising
    an open ended tubular body having an inner end and an outer end, said inner end insertable into said pipe through said opening,
    said body having a frusto-conical external wall surface portion intermediate its ends with the larger diameter thereof disposed toward said inner end of said body,
    a resiliently radially expansible sleeve surrounding said body between said outer ends and said wall surface portion,
    a nut threaded externally on said body between said sleeve and outer end and operable to force at least a portion of the sleeve onto said surface portion whereby to radially expand said sleeve outwardly to an outside diameter greater than the outside diameter of said inner end and into tight sealing engagement with said opening around said body,
    a rotary shaft extending lengthwise through and retained in said body along one side thereof,
    a circular plate connected with the inner end of said shaft and covering the inner end opening of said body whereby to close the opening, and
    means for turning said shaft from the outer end thereof whereby to displace said plate from its covering position.

References Cited by the Examiner

UNITED STATES PATENTS

| | | | |
|---|---|---|---|
| 310,107 | 12/1884 | Wilson | 251—300 |
| 634,730 | 10/1889 | Howe | 251—300 |
| 867,303 | 11/1907 | Robertson | 251—300 |
| 2,398,041 | 4/1947 | Russell | 285—208 |

FOREIGN PATENTS 9,451    12/1894    Switzerland.

M. CARY NELSON, *Primary Examiner.*

W. CLINE, *Assistant Examiner.*